US007086747B2

(12) United States Patent
Nielson et al.

(10) Patent No.: US 7,086,747 B2
(45) Date of Patent: Aug. 8, 2006

(54) LOW-VOLTAGE LIGHTING APPARATUS FOR SATISFYING AFTER-HOURS LIGHTING REQUIREMENTS, EMERGENCY LIGHTING REQUIREMENTS, AND LOW LIGHT REQUIREMENTS

(75) Inventors: Lyman O. Nielson, Fruit Heights, UT (US); Norman B. Hess, Fruit Heights, UT (US)

(73) Assignee: SAFEexit, Inc., Fruit Heights, UT (US)

( * ) Notice: Subject to any disclaimer, the term of this patent is extended or adjusted under 35 U.S.C. 154(b) by 24 days.

(21) Appl. No.: 10/733,853

(22) Filed: Dec. 11, 2003

(65) Prior Publication Data

US 2004/0257789 A1    Dec. 23, 2004

Related U.S. Application Data

(60) Provisional application No. 60/432,562, filed on Dec. 11, 2002.

(51) Int. Cl.
*F21V 23/04* (2006.01)

(52) U.S. Cl. .................. 362/20; 362/228; 362/251

(58) Field of Classification Search ............. 362/20, 362/228, 240, 260, 545, 555, 800, 249, 251
See application file for complete search history.

(56) References Cited

U.S. PATENT DOCUMENTS

| 4,204,272 | A | * | 5/1980 | Kim .................... 362/200 |
| 4,206,493 | A | * | 6/1980 | Towne et al. ............ 362/240 |
| 4,216,524 | A | * | 8/1980 | Leveraus ................. 362/464 |
| 4,255,746 | A | | 3/1981 | Johnson et al. |
| 4,419,658 | A | | 12/1983 | Jarosz et al. |
| 4,454,452 | A | | 6/1984 | Feldstein |
| 4,617,561 | A | | 10/1986 | Brown |
| D290,406 | S | | 6/1987 | Brown |
| 4,945,280 | A | | 7/1990 | Beghelli |
| 4,977,351 | A | | 12/1990 | Bavaro et al. |
| 5,130,909 | A | | 7/1992 | Gross |
| 5,145,247 | A | | 9/1992 | Mandy |
| 5,146,209 | A | | 9/1992 | Beghelli |
| 5,365,145 | A | | 11/1994 | Fields |
| 5,406,724 | A | * | 4/1995 | Lin ......................... 36/137 |
| 5,410,453 | A | * | 4/1995 | Ruskouski ................ 362/20 |
| 5,416,384 | A | | 5/1995 | Bavaro |
| 5,574,423 | A | * | 11/1996 | Vosika et al. ............. 340/333 |
| 5,587,705 | A | | 12/1996 | Morris |
| 5,731,759 | A | | 3/1998 | Finucan |
| 5,739,639 | A | | 4/1998 | Johnson |
| 5,786,767 | A | | 7/1998 | Severino |

(Continued)

OTHER PUBLICATIONS

Dimango, "Power Failure Night Light: Model HS9610", Mar. 5, 2003, 2 pages, http://www.eztone.com/hs9610.htm.

(Continued)

*Primary Examiner*—Alan Cariaso
*Assistant Examiner*—Jason Han
(74) *Attorney, Agent, or Firm*—Madson & Austin

(57) ABSTRACT

An energy-efficient lighting apparatus is disclosed. The lighting apparatus includes a ballast cover. The ballast cover includes a plurality of ballast cover holes. The lighting apparatus also includes a circuit board comprising a plurality of light-emitting diodes. The circuit board is positioned adjacent the ballast cover so that the plurality of light-emitting diodes protrude through the plurality of ballast cover holes in the ballast cover. The lighting apparatus may also include a battery for supplying power to the plurality of light-emitting diodes.

32 Claims, 5 Drawing Sheets

U.S. PATENT DOCUMENTS

| | | | |
|---|---|---|---|
| 5,833,350 A * | 11/1998 | Moreland | 362/95 |
| 5,936,532 A | 8/1999 | Peralta | |
| RE36,696 E * | 5/2000 | Blackman | 362/20 |
| 6,133,839 A | 10/2000 | Ellul, Jr. et al. | |
| 6,249,221 B1 | 6/2001 | Reed | |
| 6,384,724 B1 | 5/2002 | Landais | |
| 6,420,973 B1 | 7/2002 | Acevedo | |
| 6,609,804 B1 | 8/2003 | Nolan et al. | |
| 6,624,750 B1 | 9/2003 | Marman et al. | |
| 6,726,348 B1 * | 4/2004 | Gloisten | 362/372 |
| 6,784,357 B1 * | 8/2004 | Wang | 136/244 |
| 2004/0100787 A1 * | 5/2004 | Harris | 362/20 |

OTHER PUBLICATIONS

First Alert, "Night Lights", Mar. 5, 2003, 2 pages, http://www.firstalert.com/home_safety/night_lights/night_light_catalog.htm.

Sage Lighting Ltd., "LED Lighting Products", Feb. 6, 2004, 3 pages.

Author Unknown, "SA358: Smoke Alarm with Emergency Light", Feb. 6, 2004, 1 page.

Primatech SRL, "Gas and Smoke Detector: ESM-768 Semiconductor/Ionisation Technology", Feb. 6, 2004, 2 pages, http://www.romgaz.com.

Star Batteries, "3 in 1 LED Emergency Light: Nexstar 3 in 1 Power Failure LED Emergency Light+LED Flashlight+Night Light", Feb. 6, 2004, 3 pages.

Safe & Sound, "Kidde Ionization Smoke Alarm w/Exit Light", Feb. 6, 2004, 1 page.

Global Information, Inc., "Light Emitting Diodes for Lighting Applications", Feb. 6, 2004, 3 pages, http://www.the-infoshop.com.

National Fire Protection Association, "NFPA Fact Sheets: School, College, and University Dormitory, Fraternity and Sorority House Fires", Feb. 6, 2004, 2 pages.

Author Unknown, "Homeowners Insurance: Rising Cost of Homeowners Insurance," Feb. 6, 2004, 8 pages.

Norlux Corporation, "The LED Advantage", Feb. 6, 2004, 2 pages.

Mark Kendall and Michael Scholand, "Energy Savings Potential of Solid State Lighting in General Lighting Applications" (Final Report), Apr. 2001, 33 pages (Cover pages, p. i-ii, p. 3-31).

Steve Johnson, "The Solid State Lighting Initiative: An Industry/ DOE Collaborative Effort", Oct. 2000, 6 pages (cover, p. 1-5), Nov./Dec. 2000 Issue, Architectural Lighting.

Ledtronics, Inc., "Energy Efficient, High Powered Accent & Area Lighting LED Light Strip Illuminator Module", Oct. 2000, 1 page, http://www.ledtronics.com.

Firefly Technology Corporation, "World's First! Super Energy Efficient Solid-State Egress/Night Lighting", Copyright 2000, 2001, 2002 and 2003, 1 page, http://www.firefly-technology.com.

Oxley Developments Company, "Way Guidance Lighting Surviv Lite Emergency Egress Lighting", Oct. 1999, 2 pages, http://www.oxleygroup.com.

First Alert, "PowerFailure Night Light" (User Manual), Copyright 1997, 6 pages, http://www.firstalert.com.

Arpad A. Bergh, "A View on the Future of Solid State Lighting", IODA Optoelectronics Industry Development Association, date unknown, 6 pages.

The Bodine Company, Inc., "GTD™ Generator Transfer Device for Generator-Supplied Lighting", date unknown, 2 pages, http://www.bodine.com.

Firefly Technology Corporation, "Down Light/ Night Light Strip", date unknown, 1 page.

Firefly Technology Corporation, "Super Energy Efficient Solid-State Egress/ Night Lighting", date unknown, 1 page.

Author Unknown, Egress Aisles-Exit Signs- Egress Lighting Requirements, date unknown, 2 pages.

* cited by examiner

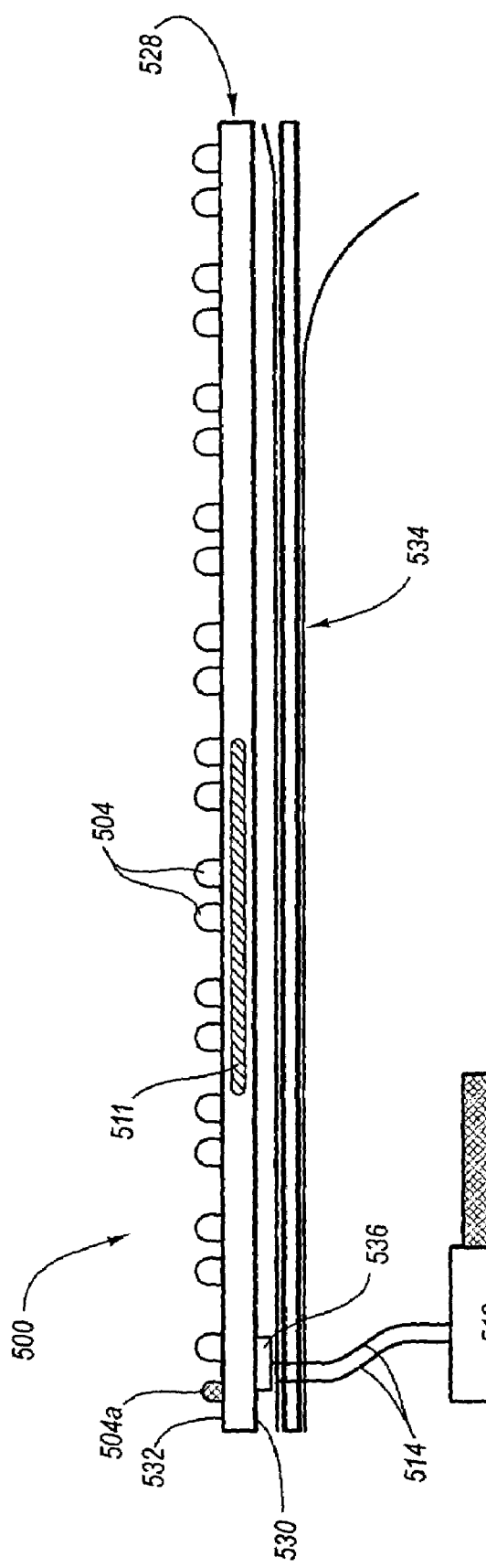
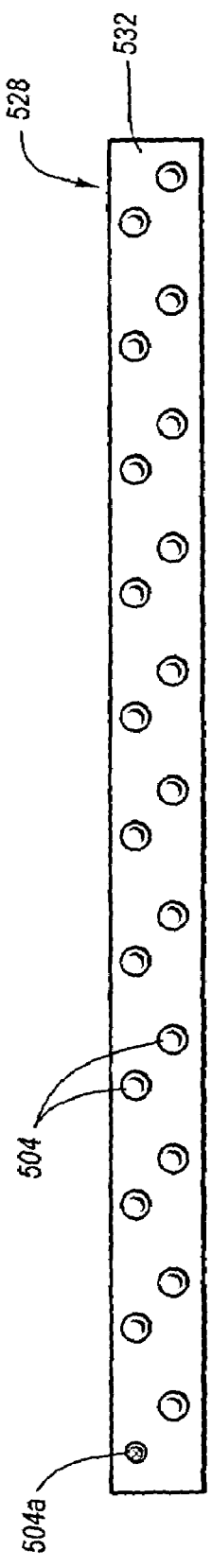
Fig. 5
Fig. 6

LOW-VOLTAGE LIGHTING APPARATUS FOR SATISFYING AFTER-HOURS LIGHTING REQUIREMENTS, EMERGENCY LIGHTING REQUIREMENTS, AND LOW LIGHT REQUIREMENTS

RELATED APPLICATIONS

This application is related to and claims priority from U.S. patent application Ser. No. 60/432,562, filed Dec. 11, 2002, for "Low-Voltage Lighting Apparatus," with inventors Lyman O. Nielson and Norman B. Hess, which is incorporated herein by reference.

TECHNICAL FIELD

The present invention relates generally to lighting apparatus for use in buildings. More specifically, the present invention relates to lighting apparatus that provide sufficient illumination to satisfy after-hours lighting requirements, emergency lighting requirements, and low light requirements.

BACKGROUND

There are many types of light fixtures. Light fixtures may utilize incandescent lamps, fluorescent lamps, metal halide lamps, and others. One of the most widely used light fixtures for large buildings, stores, warehouses, manufacturing facilities, and the like is the fluorescent light fixture. Fluorescent light fixtures are efficient to operate and are capable of illuminating relatively large areas.

A typical fluorescent light fixture has an elongated housing, usually made of metal or plastic with a downwardly opening elongated cavity in which is carried one or more tubular fluorescent lamps for emitting light below the fixture. The central element in a fluorescent lamp is a sealed glass tube. The tube contains a small amount of mercury and an inert gas, typically argon, kept under very low pressure. The tube also contains a phosphor powder. The phosphor powder is coated along the inside of the glass tube. The tube has two electrodes, one at each end, which are wired to an electrical circuit. The electrical circuit is connected to an alternating current (AC) source. When a fluorescent lamp is turned on, the current flows through the electrical circuit to the electrodes. The current stimulates the mercury atoms, causing them to release ultraviolet photons. These photons in turn stimulate the phosphor, which emits visible light photons.

In most commercial buildings, it is not necessary to keep all of the light fixtures illuminated after normal business hours. Indeed, it is generally desirable to keep after-hours lighting to the minimum necessary for maintenance and security personnel to be able to effectively perform their duties. Presently, this is accomplished by turning on only a few of the available light fixtures.

Emergency lighting is utilized in most buildings to provide light for egress and to direct occupants toward the exits in case of a loss of main power to a building. This is generally accomplished by installing exit and emergency lighting fixtures at various locations, such as corridors, stairwells, ramps, escalators, aisles, exit passageways, and the like. The exit and emergency lighting fixtures are generally self-contained and may utilize small batteries which are kept charged in case of main power failure.

In some situations, it is desirable to have only a minimal amount of light within a room. For example, when a person is giving a presentation that includes the display of pictures and/or video, it is typically desirable for the room to be somewhat dim but not completely dark. As another example, some individuals like to reduce the amount of light within their office when they are working on a computer, in order to maximize the contrast between their computer monitor and the surrounding area. There are numerous other examples of situations where it may be desirable for the light fixtures in a particular area to be able to satisfy low light requirements, i.e., to provide only a minimal amount of light.

In view of the foregoing, benefits may be realized by improved light fixtures that are capable of satisfying after-hours lighting requirements more efficiently and conveniently than presently known light fixtures. Additional benefits may be realized if such improved light fixtures were also capable of providing emergency lighting in situations where power to a building has been lost. Yet additional benefits may be realized if such improved light fixtures were also capable of satisfying low light requirements.

SUMMARY OF THE INVENTION

An energy-efficient lighting apparatus is disclosed. The lighting apparatus includes a ballast cover. The ballast cover includes a plurality of ballast cover holes. The lighting apparatus also includes a circuit board comprising a plurality of light-emitting diodes. The circuit board is positioned adjacent the ballast cover so that the plurality of light-emitting diodes protrude through the plurality of ballast cover holes in the ballast cover. The lighting apparatus may also include a battery for supplying power to the plurality of light-emitting diodes.

The lighting apparatus may also include a switching circuit for controlling illumination of the plurality of light-emitting diodes. The switching circuit may include a first portion for placing the switching circuit in communication with a wall switch. The switching circuit may also include a second portion for coupling the switching circuit to the battery. The switching circuit may also include a third portion for coupling the switching circuit to the plurality of light-emitting diodes.

In some embodiments, the switching circuit couples the battery to the plurality of light-emitting diodes if the switching circuit is not receiving AC voltage from an AC voltage source that is coupled to the wall switch. The switching circuit does not couple the battery to the plurality of light-emitting diodes if the switching circuit is receiving the AC voltage from the AC voltage source.

Alternatively, the switching circuit may additionally include a fourth portion for receiving an alarm signal from an alarm device. The switching circuit couples the battery to the plurality of light-emitting diodes if the switching circuit is receiving the alarm signal.

The lighting apparatus may also include a battery charging circuit for charging the battery. The battery charging circuit may include a first portion for coupling the battery charging circuit to an AC voltage source. The battery charging circuit may also include a second portion for coupling the battery charging circuit to the battery.

In some embodiments, the circuit board additionally includes a battery test light coupled to the battery. The battery test light may protrude through one of the plurality of ballast cover holes.

An energy-efficient lighting apparatus for retrofit with an existing light fixture having a ballast cover is also disclosed. The lighting apparatus includes a housing having an attachment surface and an illumination surface. The illumination surface includes a plurality of illumination surface holes. The lighting apparatus also includes a circuit board comprising a plurality of light-emitting diodes. The circuit board is positioned adjacent the housing so that the plurality of light-emitting diodes protrude through the plurality of illumination surface holes in the illumination surface. The lighting apparatus also includes a fastening mechanism for securing the attachment surface of the lighting apparatus to the ballast cover.

The lighting apparatus may also include a connector in the attachment surface of the housing that snaps into a ballast cover hole in the ballast cover. Wires may be provided for connecting the circuit board to the battery through the connector. In some embodiments, the fastening mechanism may include an adhesive strip having a protective cover.

A method for providing illumination to an area in an energy-efficient manner is also disclosed. The method involves providing a ballast cover. The ballast cover is attachable to a light fixture. The ballast cover has a plurality of ballast cover holes. The method also involves providing a circuit board that includes a plurality of light-emitting diodes. The method additionally involves positioning the circuit board adjacent the ballast cover so that the plurality of light-emitting diodes protrude through the plurality of ballast cover holes in the ballast cover.

In some embodiments, the method additionally involves illuminating the plurality of light-emitting diodes when a light bulb within the light fixture is not illuminated. Alternatively, the method may involve not illuminating the plurality of light-emitting diodes when the light bulb within the light fixture is illuminated. Alternatively still, the method may involve receiving an alarm signal from an alarm device, and, in response to receiving the alarm signal, illuminating the plurality of light-emitting diodes.

A method for retrofitting a light fixture with an energy-efficient lighting apparatus is also disclosed. The light fixture includes a ballast cover. The method involves providing a housing having an attachment surface and an illumination surface. The illumination surface includes a plurality of illumination surface holes. The method also involves providing a circuit board comprising a plurality of light-emitting diodes. The method also involves positioning the circuit board adjacent the housing so that the plurality of light-emitting diodes protrude through the plurality of illumination surface holes in the illumination surface. The method also involves securing the attachment surface of the housing to the ballast cover.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 5 is a side plan view of another embodiment of a lighting apparatus; and

FIG. 6 is a top plan view of the embodiment of the lighting apparatus shown in FIG. 5.

DETAILED DESCRIPTION

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Figure 1:
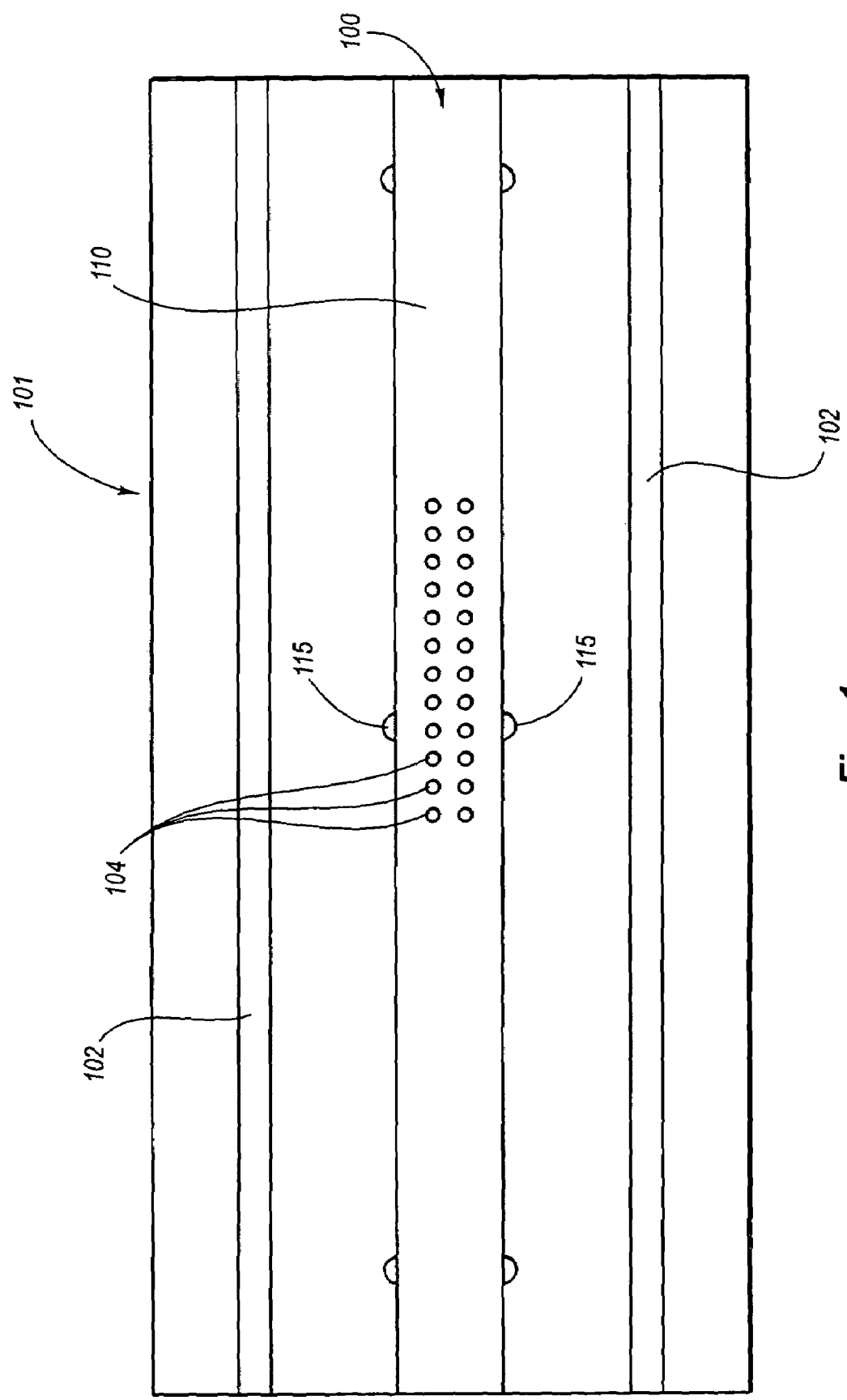
FIG. 1 is a top plan view of an embodiment of a lighting apparatus that provides sufficient illumination to satisfy after-hours lighting requirements, emergency lighting requirements, and low light requirements.

FIG. 1 is a top plan view of an embodiment of a lighting apparatus 100 installed in a light fixture housing 101. In the illustrated embodiment, the lighting apparatus 110 includes a ballast cover 110. The ballast cover 110 includes a plurality of notches 115 that hold the ballast cover 110 in place within the light fixture housing 101. The lighting apparatus 100 also includes a plurality of light-emitting diodes (LEDs) 104, which protrude through holes in the ballast cover 110.

In addition to the lighting apparatus 100, a pair of fluorescent lights 102 are also installed in the light fixture housing 101. As shown in FIG. 1, when the lighting apparatus 100 and the fluorescent lights 102 are installed in the light fixture housing 101, the fluorescent lights 102 and the LEDs 104 are visible when looking at the finished side of the light fixture housing 101.

The fluorescent lights 102 and the LEDs 104 may be turned on at different times to accomplish different purposes. For example, the fluorescent lights 102 may be turned on in a building during normal business hours. The LEDs 104 may be turned on at night to satisfy after-hours lighting requirements. The LEDs 104 may also be turned on to provide emergency lighting when power to a building has been lost. The LEDs 104 may also be turned on at various times to satisfy low light requirements.

The use of LEDs 104 to satisfy after-hours lighting requirements, emergency lighting requirements, and/or low light requirements may result in significant power savings. Typically, LEDs 104 consume significantly less power than fluorescent lights 102. For example, the power consumption of an average fluorescent light bulb 102 is 77–96 watts. In contrast, the power consumption of 80 LEDs 104 is only approximately 8 watts.

Power is supplied to the fluorescent lights 102 from an AC source by means of a ballast (not shown). The ballast cover 110 covers the primary wiring to the fixture 101, including the ballast. In some contexts, the ballast cover 110 may be referred to as a raceway cover. The ballast is coupled to an AC voltage source by means of a wall switch (not shown), i.e., a switch that is mounted to a wall within a room where the light fixture housing 101 is installed. The wall switch is accessible to individuals within the room, and allows individuals to turn the fluorescent lights 102 on and off. When the wall switch is in a closed position, the AC voltage source supplies AC voltage to the ballast. The ballast maintains a desired current through the fluorescent lights 102 so that the fluorescent lights 102 are illuminated. When the wall switch is in an open position, the AC voltage source does not supply AC voltage to the ballast. Consequently, the ballast does not maintain any current through the fluorescent lights 102, and the fluorescent lights 102 are not illuminated.

Figure 2:
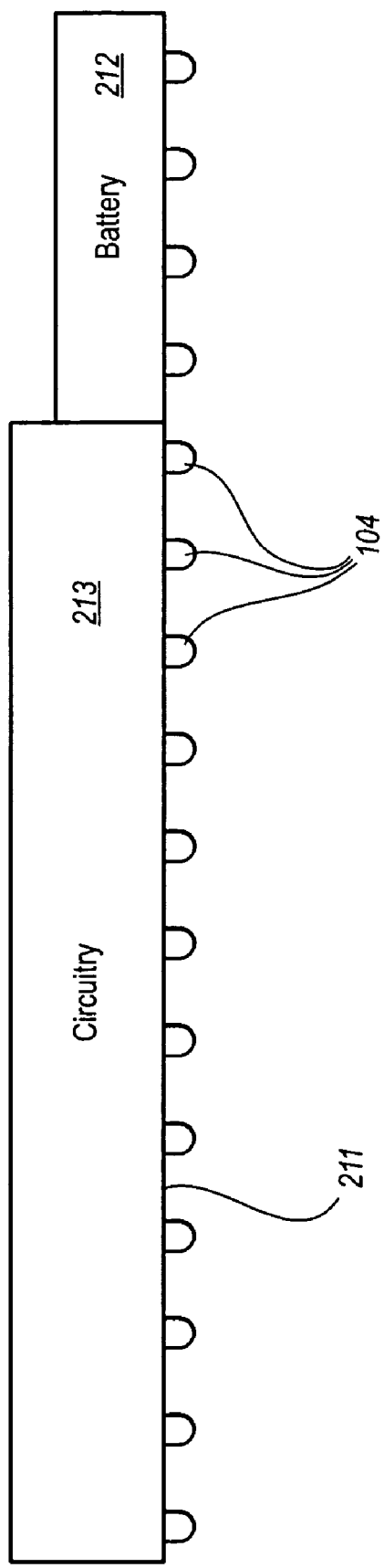
FIG. 2 is a side plan view of the plurality of light-emitting diodes in the lighting apparatus of FIG. 1 coupled to a circuit board.

FIG. 2 is a side plan view of the plurality of light-emitting diodes 104 in the lighting apparatus 100 of FIG. 1 coupled to a circuit board 211. The circuit board 211 holds the LEDs 104 in place. The circuit board 211 is shown without the ballast cover 110 in FIG. 2. However, at some point during installation of the lighting apparatus 100, the circuit board 211 is positioned adjacent the ballast cover 110 so that the LEDs 104 protrude through holes in the ballast cover 110. In some embodiments, the circuit board 211 may be secured to the ballast cover 110. As used herein, the term "secured" includes but does not require direct contact. That is, the circuit board 211 may be directly touching the ballast cover 110. Alternatively, the circuit board 211 may not be directly touching the ballast cover 110. When the lighting apparatus 100 is installed in a light fixture housing 101, the circuit board 211 is part of the ballast compartment, or raceway.

The lighting apparatus 100 includes a battery 212 for supplying DC voltage to the LEDs 104. The lighting apparatus 100 may also include circuitry 213 for accomplishing various functionality. The battery 212 and the circuitry 213 are coupled to the circuit board 211. Connectors may be used to couple the battery 212 and the circuitry 213 to the circuit board 211. In alternative embodiments, wires may be used.

The circuitry 213 may include a switching circuit that controls when DC voltage from the battery 212 is supplied to the LEDs 104. The circuitry 213 may also include a battery charging circuit that charges the battery 212. The switching circuit and the battery charging circuit are not specifically shown in FIG. 2. However, these circuits will be discussed below.

The embodiment of the lighting apparatus 100 shown in FIGS. 1–2 and discussed in connection therewith may be used to replace existing ballast covers. Alternatively, or in addition, the lighting apparatus 100 may be used in new installations of light fixtures.

Figure 3:
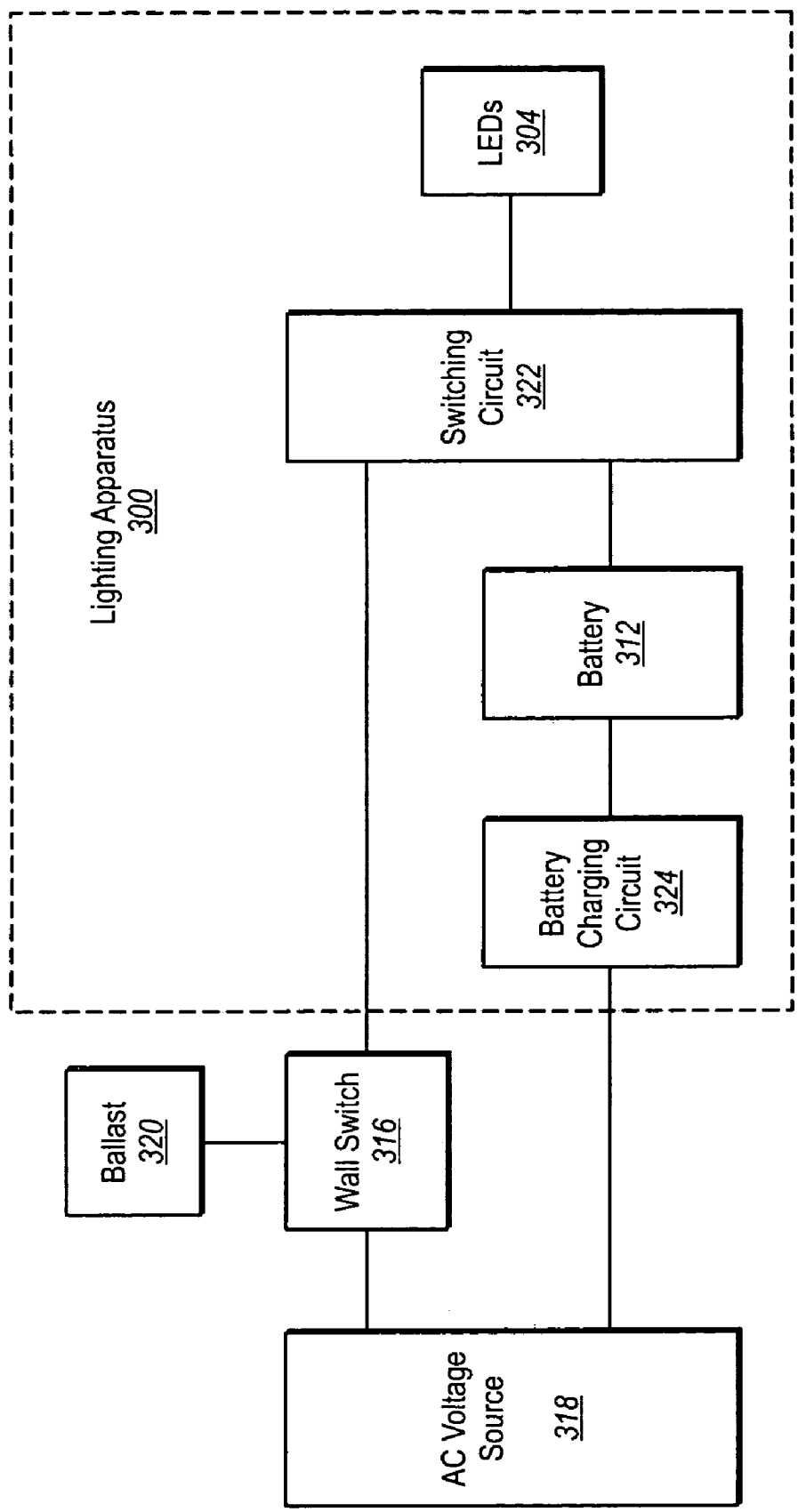
FIG. 3 is a block diagram illustrating various components in an embodiment of the lighting apparatus as well as several additional components that are used with the lighting apparatus in typical operation.

FIG. 3 is a block diagram illustrating various components in an embodiment of the lighting apparatus 300. FIG. 3 also illustrates several components that are used with the lighting apparatus 300 in typical operation.

The components that are used with the lighting apparatus 300 include a wall switch 316, an AC voltage source 318, and a ballast 320. The wall switch 316 couples the AC voltage source 318 to the ballast 320. As discussed above, when the wall switch 316 is in the closed position, the AC voltage source 318 supplies AC voltage to the ballast 320. The ballast 320 maintains a desired current through the fluorescent lights 102, so that the fluorescent lights 102 are illuminated. When the wall switch is in the open position, the AC voltage source does not supply AC voltage to the ballast 320, and the fluorescent lights 102 are not illuminated.

The lighting apparatus 300 includes a switching circuit 322. In general terms, the switching circuit 322 performs the function of controlling the illumination of the LEDs 304. More specifically, the switching circuit 322 couples the battery 312 to the LEDs 304 under some circumstances. However, under other circumstances, the switching circuit 322 does not couple the battery 312 to the LEDs 304. If the battery 312 is coupled to the LEDs 304, DC voltage from the battery 312 is provided to the LEDs 304, and the LEDs 304 are illuminated. If the battery 312 is not coupled to the LEDs 304, DC voltage from the battery 312 is not provided to the LEDs 304, and the LEDs 304 are not illuminated.

The switching circuit 322 is in communication with the wall switch 316. In some embodiments, the switching circuit 322 is directly coupled to the wall switch 316. In other embodiments, the switching circuit 322 is not directly coupled to the wall switch 316, but is in electronic communication with the wall switch 316. For example, the wall switch 316 and the switching circuit 322 may communicate via a wireless protocol. In typical operation, the wall switch 316 controls the behavior of the switching circuit 322. For example, in some embodiments if the wall switch 316 is in a first position, the switching circuit 322 couples the battery 312 to the LEDs 304. If the wall switch 316 is in a second position, the switching circuit 322 does not couple the battery 312 to the LEDs 304. As discussed above, the wall switch 316 is typically operated by individuals in the room where the lighting apparatus 300 is installed.

In the illustrated embodiment, the switching circuit 322 couples the battery 312 to the LEDs 304 whenever the switching circuit 322 is not receiving AC voltage from the AC voltage source 318. Conversely, the switching circuit 322 does not couple the battery 312 to the LEDs 304 whenever the switching circuit 322 is receiving AC voltage from the AC voltage source 318. Those skilled in the art will recognize that there are numerous ways to implement a switching circuit 322 that performs the described functions. In some embodiments, the switching circuit 322 may include one or more relays.

In the illustrated embodiment, the switching circuit 322 is coupled to the AC voltage source 318 via the wall switch 316. Consequently, the switching circuit 322 receives AC voltage from the AC voltage source 318 if two conditions are satisfied: first, the AC voltage source 318 is supplying AC voltage; and second, the wall switch 316 is in the closed position. Conversely, the switching circuit 322 does not receive AC voltage from the AC voltage source 318 if the wall switch 316 is in the open position. The switching circuit 322 also does not receive AC voltage from the AC voltage source 318 if the AC voltage source 318 is not supplying AC voltage (i.e., if power to the building has been lost).

One implication of the switching circuit 322 configuration discussed above is that as long as the battery 312 is supplying DC voltage, the LEDs 304 are illuminated whenever the fluorescent lights 102 are turned off. To see why, note that the fluorescent lights 102 are turned off when the wall switch 316 is in the open position. When the wall switch 316 is in the open position, AC voltage from the AC voltage source 318 is not supplied to the switching circuit 322. Because the switching circuit 322 is not receiving AC voltage, the switching circuit 322 couples the battery 312 to the LEDs 304. Consequently, DC voltage from the battery 312 is provided to the LEDs 304 and the LEDs 304 are illuminated.

Another implication of the switching circuit 322 configuration discussed above is that the LEDs 304 are not illuminated when the fluorescent lights 102 are turned on. To see why, note that the fluorescent lights 102 are turned on when the wall switch 316 is in the closed position. When the wall switch 316 is in the closed position, AC voltage from the AC voltage source 318 is supplied to the switching circuit 322. Because the switching circuit 322 is receiving AC voltage, the switching circuit 322 does not couple the battery 312 to the LEDs 304. Consequently, the battery 312 is not coupled to the LEDs 304, and DC voltage from the battery 312 is not provided to the LEDs 304. The LEDs 304, therefore, are not illuminated.

Yet another implication of the switching circuit 322 configuration discussed above is that as long as the battery 312 is supplying DC voltage, the LEDs 304 are illuminated whenever the AC voltage source 318 is not supplying AC voltage (i.e., when power is lost). To see why, note that if the AC voltage source 318 is not supplying AC voltage, the switching circuit 322 is not receiving AC voltage. Because the switching circuit 322 is not receiving AC voltage, the switching circuit 322 couples the battery 312 to the LEDs 304. Consequently, DC voltage from the battery 312 is provided to the LEDs 304 and the LEDs 304 are illuminated.

Another component of the lighting apparatus 300 that is shown in FIG. 3 is a battery charging circuit 324. The battery charging circuit 324 is coupled to the battery 312 and performs the function of charging the battery 312. In the illustrated embodiment, the battery charging circuit 324 is coupled to the AC voltage source 318. As long as the AC voltage source 318 is supplying AC voltage, the battery charging circuit 324 is charging the battery 312. Those skilled in the art will recognize that there are numerous ways to implement a battery charging circuit 324 that performs the described functions.

Advantageously, the battery charging circuit 324 allows the battery 312 to be charging even while the battery 312 is supplying DC voltage to the LEDs 304. This is because the battery charging circuit 324 is coupled directly to the AC voltage source 318, not to the wall switch 316. Thus, even when the wall switch 316 is in the open position (which, as discussed above, causes the LEDs 304 to be illuminated), AC voltage is being supplied to the battery charging circuit 324. Consequently, illuminating the LEDs 304 generally does not drain the battery 312. Another advantage of the battery charging circuit 324 is that the battery 312 is ordinarily fully charged when an emergency situation occurs and power to a building is lost.

In some embodiments, a separate battery 312 and battery charging circuit 324 may be provided for each lighting apparatus 300. In such embodiments, if something causes the battery 312 within a particular lighting apparatus 300 to stop supplying DC voltage, only that lighting apparatus 300 is affected. This might be advantageous where more than one lighting apparatus 300 is installed in the same building, particularly if the lighting apparatus 300 are used to provide emergency lighting. In contrast, in some known emergency lighting systems all of the emergency lights within the building are all dependent on the same battery. In those systems, if the battery stops functioning, this causes all of the emergency lights in the building to stop functioning.

As described above, the LEDs 304 are generally coupled to and held in place by a circuit board (not shown) that is positioned adjacent the ballast cover 110. In some embodiments, the battery 312, the switching circuit 322, and the battery charging circuit 324 may be coupled to the circuit board by means of connectors. Advantageously, this eliminates the necessity of connecting the different components by means of wires. Of course, in some embodiments the different components may be connected by means of wires.

The configuration shown in FIG. 3 is exemplary only. In some embodiments, the battery 312 may be coupled to the LEDs 304 at all times. In this configuration, the LEDs 304 would always be on, regardless of whether the fluorescent lights 102 are turned on or not.

In some embodiments, a strobe effect may be used to sequence light emitted from the LEDs 304 to direct people to an exit in an emergency situation. This may be done with the white LEDs 304. Alternatively, another color may be used, such as green lights.

Figure 4:
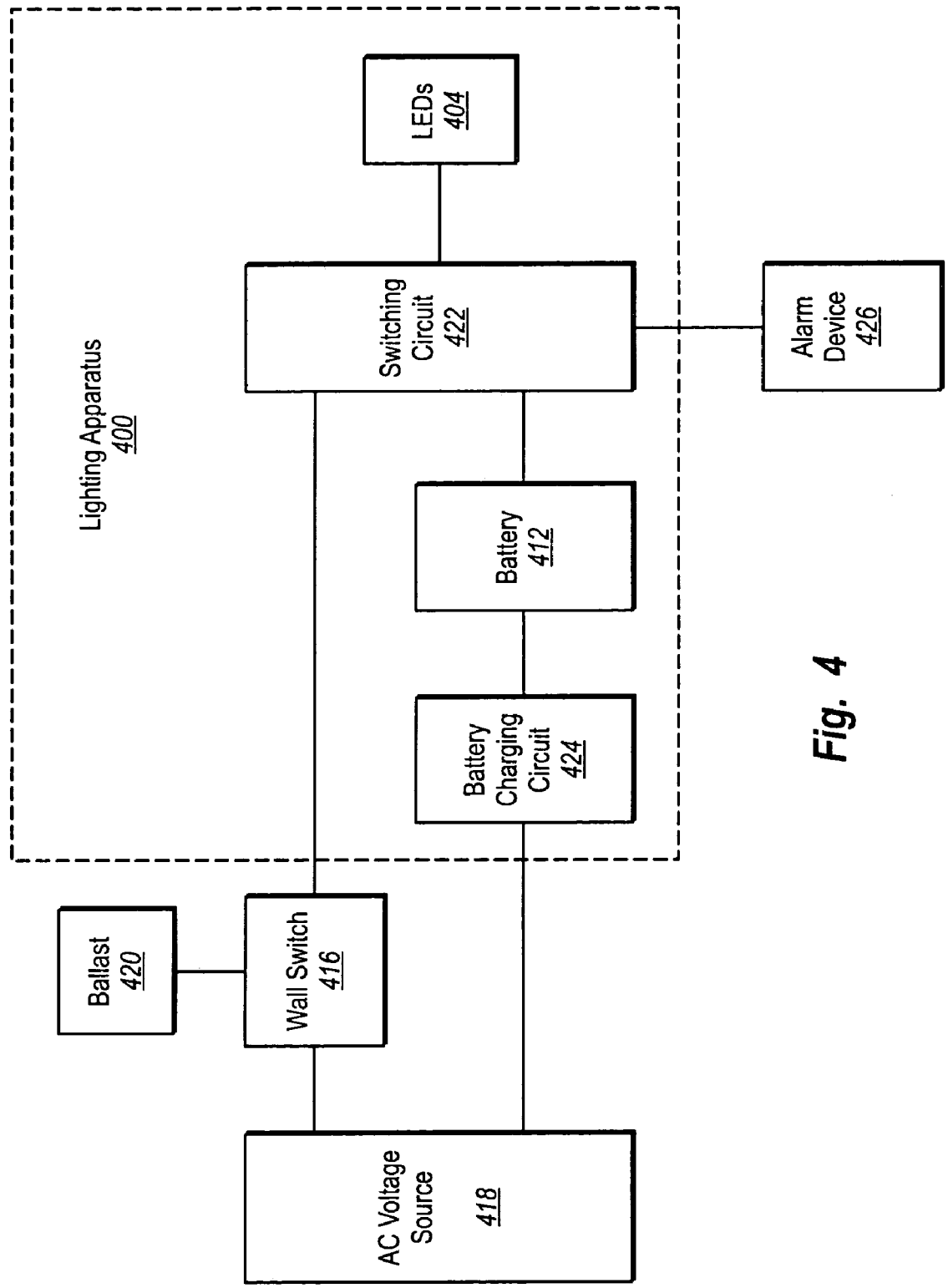
FIG. 4 is a block diagram illustrating various components in another embodiment of the lighting apparatus as well as several additional components that are used with the lighting apparatus in typical operation.

FIG. 4 is a block diagram illustrating various components in another embodiment of the lighting apparatus 400. FIG. 4 also illustrates several components that are used with the lighting apparatus 400 in typical operation. The embodiment of the lighting apparatus 400 shown in FIG. 4 is similar in many respects to the embodiment of the lighting apparatus 300 shown in FIG. 3 and described in connection therewith. Those components of the lighting apparatus 400 that are similar to components in the lighting apparatus 300 shown in FIG. 3 are labeled with corresponding reference numbers. For example, the wall switch 416 corresponds to the wall switch 316 in FIG. 3, the ballast 420 corresponds to the ballast 320 in FIG. 3, and the battery charging circuit 424 corresponds to the battery charging circuit 324 in FIG. 3. These components will not be discussed again in connection with FIG. 4.

In the illustrated embodiment, the switching circuit 422 is in electronic communication with an alarm device 426. Some examples of alarm devices 426 include a fire alarm, a smoke alarm, etc. The alarm device 426 generates an alarm signal under certain circumstances, typically in an emergency situation. The switching circuit 422 is configured to receive the alarm signal from the alarm device 426. In some embodiments, the electronic communication between the alarm device 426 and the switching circuit 422 is wireless. For example, the alarm signal may be a radio signal, and the switching circuit 422 may include an antenna for receiving the radio signal. In other embodiments, the switching circuit 422 may be electronically coupled to the alarm device 426 by means of wires or other physical connectors.

The switching circuit 422 shown in FIG. 4 couples the battery 412 to the LEDs 404 when either of two conditions occur. First, as before, the switching circuit 422 couples the battery 412 to the LEDs 404 when the switching circuit 422 is not receiving AC voltage from the AC voltage source 418. Second, the switching circuit 422 couples the battery 412 to the LEDs 404 when the switching circuit 422 receives an alarm signal from the alarm device 426. The switching circuit 422 does not couple the battery 412 to the LEDs 404 if the switching circuit 422 is receiving AC voltage from the AC voltage source 418, unless the switching circuit 422 receives an alarm signal from the alarm device 426.

One implication of the switching circuit 422 configuration shown in FIG. 4 is that the LEDs 404 may be illuminated when the fluorescent lights 102 are turned on. Specifically, if the switching circuit 422 receives an alarm signal from the alarm device 426 when the fluorescent lights 102 are turned on, the switching circuit 422 couples the battery 412 to the LEDs 404 so that the LEDs 404 are also illuminated. Such a configuration may be advantageous if an emergency situation occurs (e.g., a fire) when the fluorescent lights 102 are illuminated. In such a situation, the LEDs 404 would also be illuminated to provide additional emergency lighting.

FIG. 5 is a side plan view of another embodiment of a lighting apparatus 500. As will be described in greater detail below, the lighting apparatus 500 illustrated in FIG. 5 may easily and inexpensively be secured to existing light fixtures. Thus, existing light fixtures may be retrofit with the lighting apparatus 500 in order to achieve the energy savings described above without incurring significant expense. In the illustrated embodiment, the lighting apparatus 500 is configured to be secured to the ballast cover (not shown) within a light fixture.

The lighting apparatus 500 includes a housing 528. In some embodiments, the housing 528 is made of plastic, although the housing 528 may be made of other materials. The housing 528 is dimensioned so that it may be installed to an existing ballast cover. The housing 528 includes an attachment surface 530 and an illumination surface 532. In typical operation, the attachment surface 530 is secured to the ballast cover. The illumination surface 532 is opposite the attachment surface 530. As used herein, the terms "securing" and "secured" do not require direct contact. In other words, the attachment surface 530 of the housing 528 may be directly touching the ballast cover. Alternatively, the attachment surface 530 of the housing 528 may not be directly touching the ballast cover.

A section of the housing 528 is illustrated as being cut away from the housing 528 shown in FIG. 5 in order to expose a circuit board 511. As before, the lighting apparatus 500 includes a plurality of LEDs 504. The LEDs 504 are coupled to the circuit board 511. The circuit board 511 holds the LEDs 504 in place. The circuit board 511 is positioned adjacent the housing 528 so that the LEDs 504 protrude through a plurality of holes in the illumination surface 532 of the housing 528. The circuit board 511 may be positioned either partially or wholly inside the housing 528.

The attachment surface 530 of the housing 528 includes a fastening mechanism 534. The fastening mechanism 534 performs the function of securing the attachment surface 530 of the housing 528 to the ballast cover. In the illustrated embodiment, the fastening mechanism 534 is an adhesive strip 534 having a protective cover. The protective cover may be easily removed to expose the adhesive strip 534. One side of the adhesive strip 534 may be attached to the attachment surface 530 of the housing 528. The other side of the adhesive strip 534 may be attached to the ballast cover (not shown) to which the lighting apparatus 500 is to be installed. Of course, in alternative embodiments many different types of fastening mechanisms 534 may be used. For example, in some embodiments the fastening mechanism 534 may use a magnet, clips, screws, etc.

As before, a battery 512 is included for supplying DC voltage to the LEDs 504. A connector 536 is included in the attachment surface 530 of the housing 528 to facilitate connection of the LEDs 504 to the battery 512. One type of connector 536 that may be used is referred to as a chase nipple. Of course, other connectors 536 that may be used will be readily apparent to those skilled in the art in view of the teachings contained herein.

Advantageously, the embodiments of the low-voltage lighting apparatus 500 described in connection with FIGS. 5 and 6 may easily and inexpensively be secured to existing light fixtures. To install the lighting apparatus 500 to a ballast cover within a light fixture, a hole is drilled into the ballast cover. The connector 536 snaps into the hole and locks into place. Wires 514 from the circuit board 511 may then be connected to the battery 512 through a hole in the connector 536. Accordingly, existing light fixtures may be easily and inexpensively retrofit with the lighting apparatus 500.

As with the embodiments discussed previously, the lighting apparatus 500 shown in FIG. 5 may be used to provide emergency lighting. In many cases, retrofitting existing light fixtures with the lighting apparatus 500 may be less expensive than installing a large backup system for providing emergency lighting.

The lighting apparatus 500 shown in FIG. 5 may include various additional components that are not shown in FIG. 5. For example, the lighting apparatus 500 may also include a switching circuit and a battery charging circuit, as described above in connection with FIGS. 3 and 4.

In the illustrated embodiment, one of the LEDs 504 coupled to the circuit board 511 is a battery test light 504a. The battery test light 504a indicates whether the battery 512 is charged, i.e., capable of supplying DC voltage. The battery test light 504a is directly coupled to the battery 512. Thus, the battery test light 504a is illuminated whenever the battery 512 is capable of supplying DC voltage, even if the other LEDs 504 are not illuminated.

FIG. 6 is a top plan view of the embodiment of the lighting apparatus 500 shown in FIG. 5. The illumination surface 532 of the housing 528 is shown. The plurality of LEDs 504 protruding through the holes in the illumination surface 532 are also shown. The battery test light 504a is also shown.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

The invention claimed is:

1. An energy-efficient lighting apparatus, comprising:
   a ballast cover;
   a plurality of ballast cover holes in the ballast cover;
   a circuit board comprising a plurality of light-emitting diodes, wherein the circuit board is positioned adjacent the ballast cover so that the plurality of light-emitting diodes protrude through the plurality of ballast cover holes in the ballast cover, wherein the lighting apparatus is coupled to a wall switch and wherein the illumination of the light-emitting diodes is controllable based upon the position of the wall switch.

2. The lighting apparatus of claim 1, further comprising a battery for supplying power to the plurality of light-emitting diodes.

3. The lighting apparatus of claim 2, further comprising a switching circuit for controlling illumination of the plurality of light-emitting diodes.

4. The lighting apparatus of claim 3, wherein the switching circuit comprises:
   a first portion for placing the switching circuit in communication with a wall switch;
   a second portion for coupling the switching circuit to the battery; and
   a third portion for coupling the switching circuit to the plurality of light-emitting diodes.

5. The lighting apparatus of claim 4, wherein the switching circuit couples the battery to the plurality of light-emitting diodes if the switching circuit is not receiving AC voltage from an AC voltage source that is coupled to the wall switch, and wherein the switching circuit does not couple the battery to the plurality of light-emitting diodes if the switching circuit is receiving the AC voltage from the AC voltage source.

6. The lighting apparatus of claim 4, wherein the switching circuit further comprises a fourth portion for receiving an alarm signal from an alarm device.

7. The lighting apparatus of claim 6, wherein the switching circuit couples the battery to the plurality of light-emitting diodes if the switching circuit is receiving the alarm signal.

8. The lighting apparatus of claim 2, further comprising a battery charging circuit for charging the battery.

9. The lighting apparatus of claim 8, wherein the battery charging circuit comprises:
 a first portion for coupling the battery charging circuit to an AC voltage source; and
 a second portion for coupling the battery charging circuit to the battery.

10. The lighting apparatus of claim 2, wherein the circuit board further comprises a battery test light coupled to the battery.

11. The lighting apparatus of claim 10, wherein the battery test light protrudes through one of the plurality of ballast cover holes.

12. An energy-efficient lighting apparatus for retrofit with an existing light fixture having a ballast cover, comprising:
 a housing having an attachment surface and an illumination surface;
 a plurality of illumination surface holes in the illumination surface;
 a circuit board comprising a plurality of light-emitting diodes, wherein the circuit board is positioned adjacent the housing so that the plurality of light-emitting diodes protrude through the plurality of illumination surface holes in the illumination surface; and
 a fastening mechanism for securing the attachment surface of the lighting apparatus to the illumination surface, wherein the lighting apparatus is coupled to a wall switch and wherein the illumination of the light-emitting diodes is controllable based upon the position of the wall switch.

13. The lighting apparatus of claim 12, further comprising a battery for supplying power to the plurality of light-emitting diodes.

14. The lighting apparatus of claim 13, further comprising a switching circuit for controlling illumination of the plurality of light-emitting diodes.

15. The lighting apparatus of claim 14, wherein the switching circuit comprises:
 a first portion for placing the switching circuit in communication with a wall switch;
 a second portion for coupling the switching circuit to the battery; and
 a third portion for coupling the switching circuit to the plurality of light-emitting diodes.

16. The lighting apparatus of claim 15, wherein the switching circuit couples the battery to the plurality of light-emitting diodes if the switching circuit is not receiving AC voltage from an AC voltage source that is coupled to the wall switch, and wherein the switching circuit does not couple the battery to the plurality of light-emitting diodes if the switching circuit is receiving the AC voltage from the AC voltage source.

17. The lighting apparatus of claim 15, wherein the switching circuit further comprises a fourth portion for receiving an alarm signal from an alarm device.

18. The lighting apparatus of claim 17, wherein the switching circuit couples the battery to the plurality of light-emitting diodes if the switching circuit is receiving the alarm signal.

19. The lighting apparatus of claim 13, further comprising a battery charging circuit for charging the battery.

20. The lighting apparatus of claim 19, wherein the battery charging circuit comprises:
 a first portion for coupling the battery charging circuit to the AC voltage source; and
 a second portion for coupling the battery charging circuit to the battery.

21. The lighting apparatus of claim 13, wherein the circuit board further comprises a battery test light coupled to the battery.

22. The lighting apparatus of claim 21, wherein the battery test light protrudes through one of the plurality of illumination surface holes.

23. The lighting apparatus of claim 12, further comprising:
 a connector in the attachment surface of the housing that snaps into an illumination cover hole in the illumination surface; and
 wires connecting the circuit board to the battery through the connector.

24. The lighting apparatus of claim 12, wherein the fastening mechanism comprises an adhesive strip having a protective cover.

25. A method for providing illumination to an area in an energy-efficient manner, comprising:
 providing a ballast cover, the ballast cover having a plurality of ballast cover holes, the ballast cover being attachable to a light fixture;
 providing a circuit board comprising a plurality of light-emitting diodes; and
 positioning the circuit board adjacent the ballast cover so that the plurality of light-emitting diodes protrude through the plurality of ballast cover holes in the ballast cover, wherein the light fixture is coupled to a wall switch and wherein the illumination of the light-emitting diodes is controllable based upon the position of the wall switch.

26. The method of claim 25, further comprising illuminating the plurality of light-emitting diodes when a light bulb within the light fixture is not illuminated.

27. The method of claim 25, further comprising not illuminating the plurality of light-emitting diodes when a light bulb within the light fixture is illuminated.

28. The method of claim 25, further comprising:
 receiving an alarm signal from an alarm device; and
 in response to receiving the alarm signal, illuminating the plurality of light-emitting diodes.

29. A method for retrofitting a light fixture with an energy-efficient lighting apparatus, the light fixture having a ballast cover, the method comprising:
 providing a housing having an attachment surface and an illumination surface, wherein the illumination surface comprises a plurality of illumination surface holes;
 providing a circuit board comprising a plurality of light-emitting diodes;
 positioning the circuit board adjacent the housing so that the plurality of light-emitting diodes protrude through the plurality of illumination surface holes in the illumination surface; and
 securing the attachment surface of the housing to the illumination surface, wherein the lighting apparatus is coupled to a wall switch and wherein the illumination of the light-emitting diodes is controllable based upon the position of the wall switch.

30. The method of claim 29, further comprising illuminating the plurality of light-emitting diodes when a light bulb within the light fixture is not illuminated.

31. The method of claim 29, further comprising not illuminating the plurality of light-emitting diodes when a light bulb within the light fixture is illuminated.

32. The method of claim 29, further comprising:
receiving an alarm signal from an alarm device; and
in response to receiving the alarm signal, illuminating the plurality of light-emitting diodes.

* * * * *